Aug. 3, 1954     E. L. WINTERMANN     2,685,433
METHOD AND APPARATUS FOR AIR CONDITIONING ENCLOSURES
Filed Sept. 21, 1950
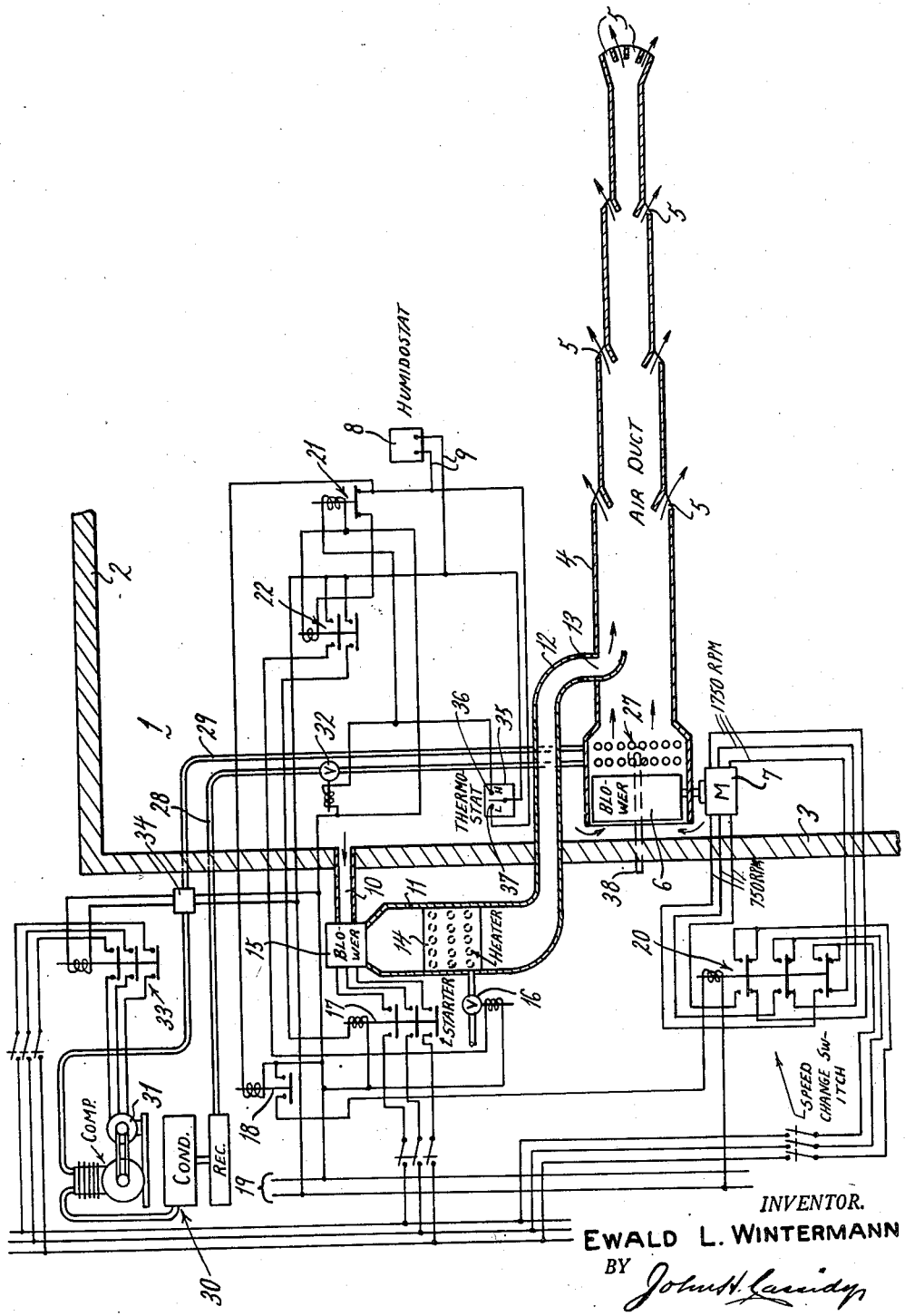
INVENTOR.
EWALD L. WINTERMANN
BY John H. Cassidy
ATTORNEY Patented Aug. 3, 1954

2,685,433

UNITED STATES PATENT OFFICE 2,685,433

METHOD AND APPARATUS FOR AIR CONDITIONING ENCLOSURES

Ewald L. Wintermann, St. Louis, Mo.

Application September 21, 1950, Serial No. 185,920

5 Claims. (Cl. 257—3)

1

This invention pertains to a method and means for maintaining the air in an enclosure at a constant condition of relative humidity and temperature.

It has been found that, in order to store certain products such as candy, meats and fish, fruit, etc., it is necessary to keep the condition of the air in the storage room constant, particularly as to its relative humidity, within very narrow limits. Many attempts have been made to obtain such a condition in a commercial storage room without complete success. The frequent openings of doors for bringing in new products for storage periodically disturbs the condition of the air, both by letting in outside air and by bringing in moisture entrapped in the goods brought in, and in their containers where the latter are made of cardboard or the like. Accordingly, the air must be continuously dehumidified and its temperature readjusted. Attempts to do this by automatic or manual means have heretofore been without complete success.

It is an object of this invention, therefore, to provide a method and means whereby the air in such a storage room may be maintained in constant condition within narrow limits. It has been found that it is practically impossible under commercial conditions to do this by manual operation. Accordingly, a method adapted particularly to be carried out automatically is an important object of this invention.

In accordance with this method, generally stated, when the condition of the air in the storage room is disturbed, always by the addition of moisture since the uniform condition to be maintained is practically always below that of the normal atmosphere both in temperature and relative humidity, the room air is first warmed slightly. This tends to bring the relative humidity back to the desired value. The increase in temperature is then caused to operate a thermostat in response to which a portion of the air is chilled rapidly to its dew-point so that moisture is condensed therefrom. The condensed moisture is drained out of the enclosure. The chilled air is then mixed with the remaining air to bring the room temperature back to the desired value. Automatic means are provided to carry out these operations in the sequence stated and in such a way that both temperature and relative humidity are kept constant within very narrow limits.

An organization of apparatus for carrying out the method of this invention is illustrated in the accompanying drawing which is a diagram representing a portion of a storage room and apparatus organized to carry out this method.

Referring to the drawing, a storage room 1 is represented by two walls 2 and 3 thereof. Mounted to extend along the room, usually on the ceiling thereof is an air duct 4 arranged to distribute air which is circulated through said duct. At intervals along the duct, outlet openings 5 are provided so that air passing through the duct will be delivered at various points in the room for circulation therethrough. Air circulating means, indicated in the drawing as a blower 6, is mounted in the duct 4. This blower is driven by any suitable means such as a motor 7 and under normal conditions operates continuously to keep the air in continual circulation. The motor 7 is shown in the drawing as a two-speed motor, though any other means for varying its speed may be used.

Mounted in the room at a point where an average conditions of the air may be expected is a humidostat 8. This instrument is one responsive to relative humidity and operates to close an electric circuit 9. This circuit controls the operation of the air heating means for warming the air as stated above.

An air duct is provided by a tube 10 passing through the wall 3 of the room and open to the interior thereof, said tube connecting with an enclosure 11 and a tube 12 leading from the outlet of the enclosure 11 back through the wall 3 into the room 1 and entering the duct 4 at 13. Mounted in the enclosure 11 is a heater 14. A blower 15 is arranged to draw air from the room through the tube 10 and blow it over the heater 14 to be discharged through the tube 12 into the duct 4. The heater 14 may be of any suitable type. In the drawing, a gas heater is indicated, controlled by a solenoid operated valve 16. The blower 15 may be motor driven in any well known manner, the motor being controlled by a starting solenoid switch 17.

The humidostat 8 by its circuit 9 operates to close the circuit of a relay 18 connected to a control circuit 19. The relay 18 operates to close the solenoid circuit of a switch 20. The latter switch is shown in the drawing as a two-speed switch connected to the motor 7 and adapted to control the speed thereof. In the normal position of the switch 20 when the relay 18 is open the motor 7 is connected for its higher speed. When the relay 18 closes, it operates the switch 20 to shift its contacts so as to reduce the speed of the motor 7 to its lower speed.

The humidostat 8 is also connected through the contacts of a relay 21, which contacts are normally closed, to the coil of a double pole solenoid switch 22. The contacts of this switch are connected, as shown in the drawing, respectively to the coil of the switch 17 and to that of the gas valve 16. Accordingly, when the humidostat 8 operates to close its circuit, its effect is to reduce the speed of the motor 7 and, so long as the relay 21 is not energized, also starts the operation of the heater 14 and its blower 15.

Mounted in the duct 4 near the intake end thereof and adjacent the blower 6 is a cooler 27 connected by a liquid line 28 and a return gas line 29 to a refrigerating unit 30 driven by a motor 31. The flow of refrigerant from the unit 30 to the cooler 27 is controlled by a solenoid valve 32. The operation of the refrigerating unit 30 may be controlled by a starting switch 33 for the motor 31, said switch in turn being controlled by a pressure operated relay 34 in a well known manner, so that the operation of the unit is started by an increase in pressure above a certain value and stopped by a fall of pressure below another predetermined value.

Mounted in the room 1 is a thermostat 35 having a moving contact arm adapted to engage high and low temperature contacts according to whether the temperature increases or decreases, respectively. As shown in the drawing, the high temperature contact 36 of this thermostat is connected to the coil of the solenoid valve 32 and also to the coil of the relay 21, so that upon operation of the thermostat, to close the circuit of the contact 36, the effect will be to open the valve 32 so as to supply refrigerant to the cooler 27 and at the same time to open the contacts of the relay 21 so as to stop the heater 14 and its blower 15. The low temperature contact 37 of the thermostat is connected to operate in parallel with the circuit 9 of the humidostat 8 so as to start the heater and its blower when the temperature falls.

In the operation of this apparatus, in accordance with the method of this invention, once the desired temperature and relative humidity have been established the operation of the cooler 27 by the thermostat 35 will correct ordinary variations in temperature, while the blower 6 operates continuously to keep the air in circulation. As pointed out above, changes in relative humidity are usually by the addition of moisture. When the humidity has increased to the point where the humidostat 8 operates, the following sequence of events takes place:

1. The humidostat 8 starts the heater 14 and its blower 15 and at the same time operates the relay 18 which cuts down the speed of the blower 6 from its normal speed of 1750 R. P. M. to 750 R. P. M.

2. The blower 15 draws air from the room, passes it through the heater 14 and delivers it to the duct 4 to mix with the other air being circulated.

3. This addition of warm air increases the room temperature and thereby promptly lowers the relative humidity.

4. When the room temperature reaches the critical value, the thermostat 35 operates to start the cooler 27 to functioning and, by operation of the relay 21, stops the heater unit 14, 15.

5. The cooler 27 chills the air to below its dew-point, whereupon moisture is condensed from the air, which moisture collects in the cooler and is drained off to a sewer by a drain pipe 38. On account of the lowered speed of the blower 6, the air passes over the cooler slowly enough to permit condensed moisture to be deposited on the cooler surfaces.

6. When the desired relative humidity has been established the humidostat 8 restores the blower 6 to its normal speed of 1750 R. P. M.

7. This quickly circulates the cooled air to reestablish the desired temperature, whereupon the thermostat 35 stops the operation of the cooler 27.

It will be seen that in this method the response to an increase in relative humidity is not an immediate initiation of de-humidifying action, but is an action to heat the air in the room. This operates at once to reduce the relative humidity so as to tend to restore the original condition. The increase in room temperature is then made to cause the initiation of the de-humidifying process.

Some definite advantages are gained by this method of procedure. First, the initial heating of the room, instead of immediately chilling it to condense the moisture avoids the chance of chilling the air below the low limit of the control range, and as a result the de-humidifying action takes place within the controlled range of temperature. Second, the heating of the air serves to cause the action of the thermostat to start the cooler. Finally, the chilled air leaves the cooler at a lower temperature and lower relative humidity than is required for the room as a whole. This chilled portion of the air then, by mixing with the rest of the room air, lowers the temperature of the latter and brings the relative humidity to its normal value.

It will be seen, therefore, that this invention provides a novel method which is simple to operate and can be handled by any type of apparatus capable of heating and cooling the air as set forth. While the invention has been described as carried out by certain particular devices, this apparatus may be varied through a large range. Practically any form of heating, such as electric or steam heat, can be used, and the same may be said of the cooler 27 since the temperature at which it operates is ordinarily not below the freezing point of water, a water-circulating system or similar apparatus may be used. Likewise, the electric devices for controlling the operation may be of many different kinds. As shown in the drawing, the driving motors are operated as three-phase units. However, any other type of alternating current or direct current motor may be used, and other types of control devices operate on A. C., or D. C. may be employed.

Various changes may be made in the details of construction, within the scope of the appended claims, without departing from the spirit of this invention. Parts of the invention may be used without the whole and improvements may be added while retaining some or all of the advantages of the invention.

I claim:

1. In an apparatus for refrigerating and airconditioning an enclosure, such as a storage room, air-circulating means operable to keep the room air in continuous circulation, an auxiliary air duct communicating at both ends thereof with the interior of the room, air heating and circulating means in said duct, a humidostat responsive to the relative humidity of the room air controlling the operation of said heating and circulating means and operatively connected to initiate heating of the air in said duct in response to increase in relative humidity, cooling means located in the main path of air circulation in the room, a thermostat responsive to the room temperature controlling the operation of said cooling means to chill the air to its dew-point to cause condensation of moisture therefrom, and means for draining for the condensed moisture.

2. In an apparatus for refrigerating and air-conditioning an enclosure such as a storage room, an air-distributing duct extending along the room, continuously operable air circulating means in said duct, an auxiliary air duct opening at its intake end to the room air and at its outlet end to the interior of said first duct, air heating and circulating means in said auxiliary duct, a humidostat responsive to the relative humidity of the room air connected to control the operation of said heating and circulating means and operatively connected to initiate heating of the air in said duct in response to increase in relative humidity, a thermostat responsive to the room temperature, cooling means in said first duct controlled by said thermostat and operable to chill the air passing thereover to its dew-point to condense moisture therefrom, and means for draining off the condensed moisture.

3. In an apparatus for refrigerating and air-conditioning an enclosure such as a storage room, an air-distributing duct extending along the room, continuously operable air circulating means in said duct, an auxiliary air duct opening at its intake end to the room air and at its outlet end to the interior of said first duct, air heating and circulating means in said auxiliary duct, a humidostat responsive to the relative humidity of the room air connected to control the operation of said heating and circulating means and said first circulating means to simultaneously start the former and reduce the speed of the latter, a thermostat responsive to the room temperature, cooling means in said first duct controlled by said thermostat and operable to chill the air passing thereover to its dew-point to condense moisture therefrom, and means for draining off the condensed moisture.

4. The method of maintaining constant relative humidity in an enclosure which has a normal constant velocity of flow of air therethrough, comprising the steps of reducing the normal constant velocity of flow of air through the enclosure upon an increase in relative humidity in the enclosure; heating a portion only of the flow of air and circulating the heated portion mixed with the remainder of the air through the enclosure to increase the temperature in the enclosure; chilling the air, when the temperature has reached a predetermined point, to its dew-point and condensing the moisture from the air while simultaneously discontinuing the heating of the air; draining such moisture out of the enclosure; and reestablishing the normal constant velocity of flow of air when the desired relative humidity has been established and circulating the chilled air through the enclosure to reestablish the desired temperature.

5. An apparatus for refrigerating and air-conditioning an enclosure comprising continuously operable air circulating means for creating a normal constant velocity of flow of air through the enclosure, a humidostat in said enclosure responsive in operation to the relative humidity of the enclosure air, means controlled by said humidostat for decreasing the operation of said air circulating means whereby the velocity of flow of the air is reduced, air heating means controlled by said humidostat and operatively associated with said air circulating means for heating a portion only of the air which is circulated through the enclosure by the air circulating means, a thermostat in said enclosure responsive to the enclosure temperature and operative to sense the rise in temperature of the air caused by said heating means, cooling means operatively associated with the air circulating means and controlled by the thermostat for chilling the air to its dew-point to condense moisture therefrom, means controlled by the thermostat for stopping the operation of the heating means as the operation of the cooling means is initiated, means for draining the condensed moisture from the room, said means controlled by the humidostat for decreasing the operation of the air circulating means being activated by the response of the humidity to the desired relative humidity to restore the air circulating means to normal operation and said thermostat, upon reestablishment of the desired temperature in the enclosure, being active to discontinue operation of the cooling means.

References Cited in the file of this patent

UNITED STATES PATENTS

| Number | Name | Date |
| --- | --- | --- |
| 843,909 | Peters | Feb. 12, 1907 |
| 912,815 | Cook | Feb. 16, 1909 |
| 1,623,712 | Wood | Apr. 5, 1927 |
| 2,093,968 | Kettering | Sept. 21, 1937 |
| 2,104,851 | Crawford | Jan. 11, 1938 |
| 2,180,479 | Phillip | Nov. 21, 1939 |
| 2,204,016 | Karlson | June 11, 1940 |